United States Patent [19]

Land et al.

[11] 4,161,815

[45] Jul. 24, 1979

[54] METHODS FOR MAKING ELECTRICAL CELLS AND BATTERIES

[75] Inventors: Edwin H. Land, Cambridge; Gordon F. Kinsman, Billerica, both of Mass.

[73] Assignee: Polaroid Corporation, Cambridge, Mass.

[21] Appl. No.: 858,685

[22] Filed: Dec. 8, 1977

Related U.S. Application Data

[62] Division of Ser. No. 811,472, Jun. 30, 1977, Pat. No. 4,124,742.

[51] Int. Cl.² .................................................. H01M 6/00
[52] U.S. Cl. ................................. 29/623.4; 29/623.3; 29/730; 156/324
[58] Field of Search ................... 29/623.3, 623.4, 623.5, 29/623.2, 730; 429/152, 162, 149, 153, 160, 122; 156/324

[56] References Cited

U.S. PATENT DOCUMENTS

| | | | |
|---|---|---|---|
| 3,563,805 | 2/1971 | Deierhoi, Jr. | 429/162 |
| 3,652,281 | 3/1972 | Bachelder et al. | 96/76 |
| 3,734,780 | 5/1973 | Bilhorn et al. | 429/162 |
| 3,752,723 | 8/1973 | Bruneau | 156/324 |
| 3,770,505 | 11/1973 | Bergum et al. | 429/210 |
| 3,793,023 | 2/1974 | Land | 96/77 |
| 4,007,472 | 2/1977 | Land | 429/153 |
| 4,019,251 | 4/1977 | McCole | 29/623.3 |
| 4,047,289 | 9/1977 | Wolff | 29/623.4 |

*Primary Examiner*—C. W. Lanham
*Assistant Examiner*—Daniel C. Crane
*Attorney, Agent, or Firm*—John W. Ericson

[57] ABSTRACT

A laminar battery comprising subassemblies made by laminating cellophane to a sheet of conductive plastic on which a series of metallic electrodes have been formed in a series of regions within the confines of the sheet, in which the cellophane is caused to adhere to the plastic and to the electrode patches by feeding the cellophane and the conductive plastic between nip rolls under pressure and supplying a small amount of an aqueous bonding composition containing a small amount of a water soluble bonding agent between the layers ahead of the nip in the rolls. The laminate so made is dried in air and may be rolled for storage and later assembly into batteries. Electrical cells and batteries made with the process just outlined.

8 Claims, 10 Drawing Figures

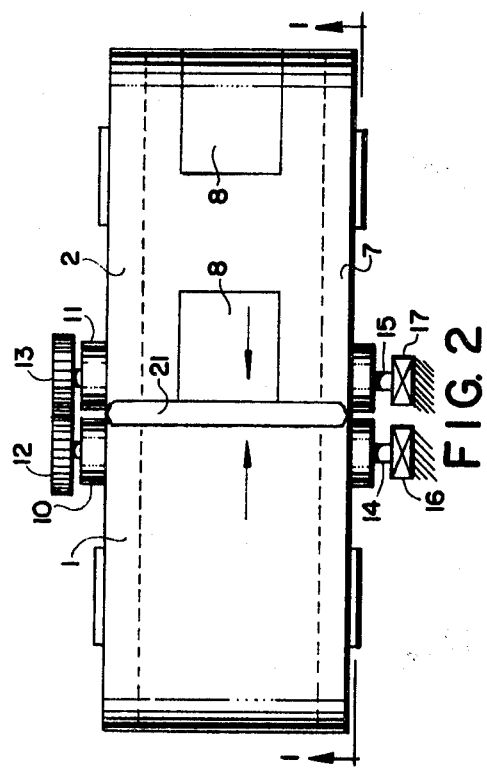
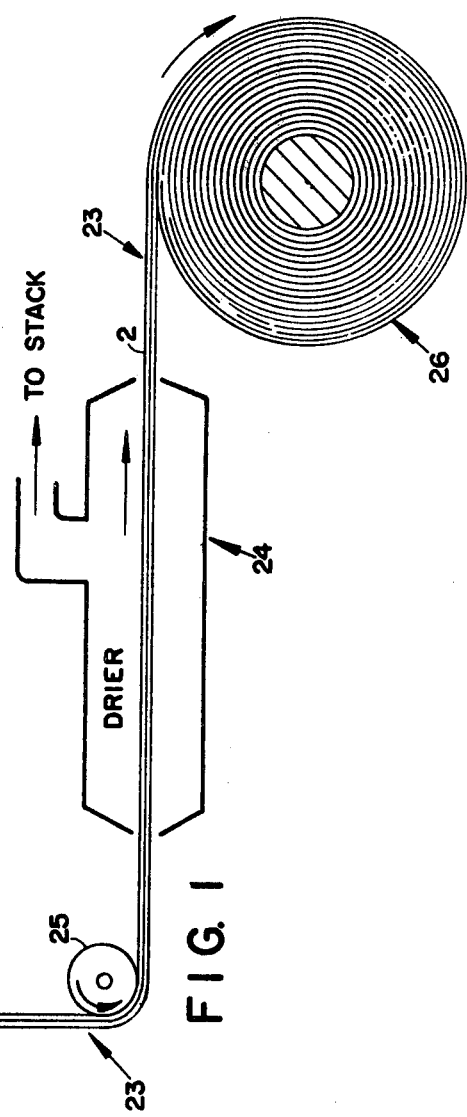
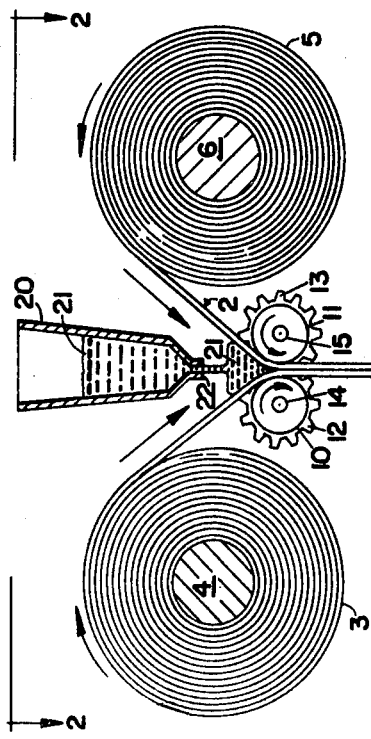
FIG. 1
FIG. 2

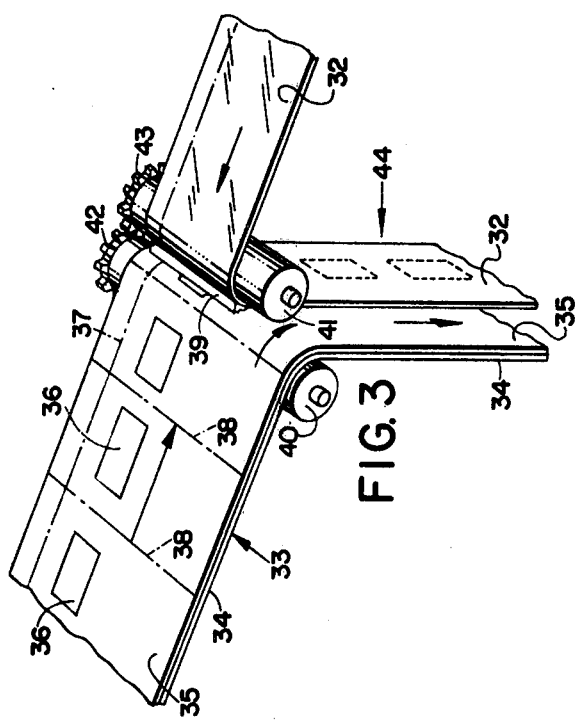
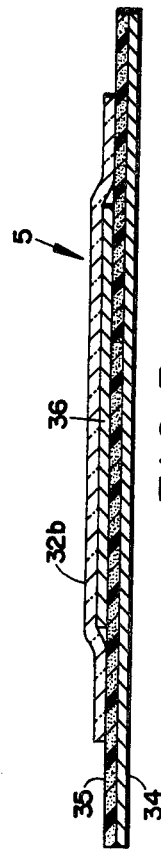
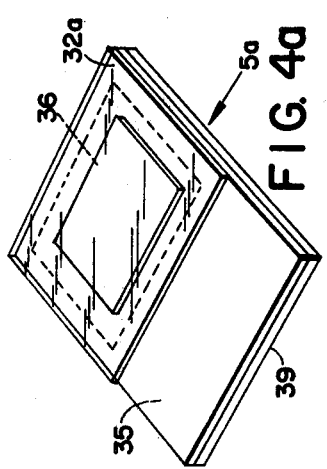
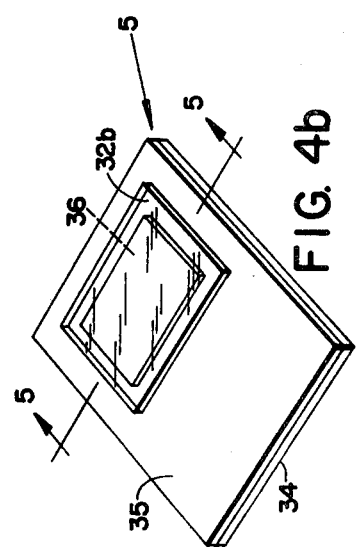

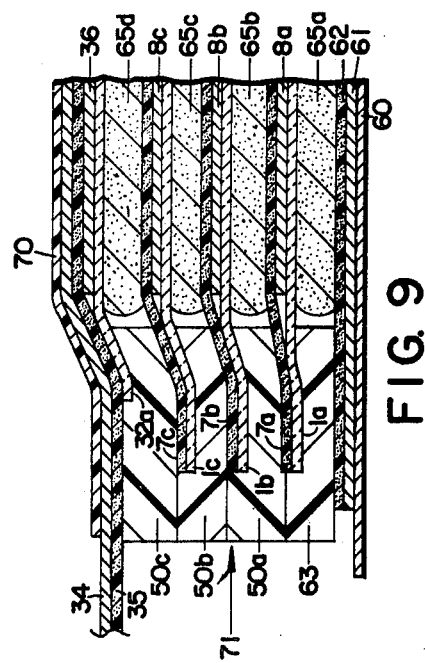
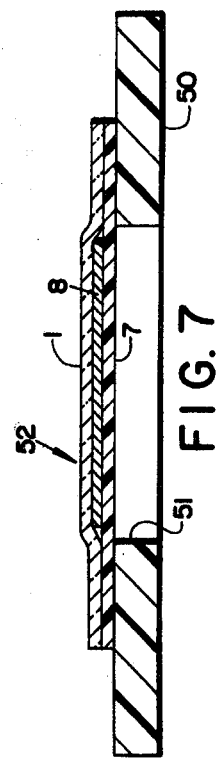
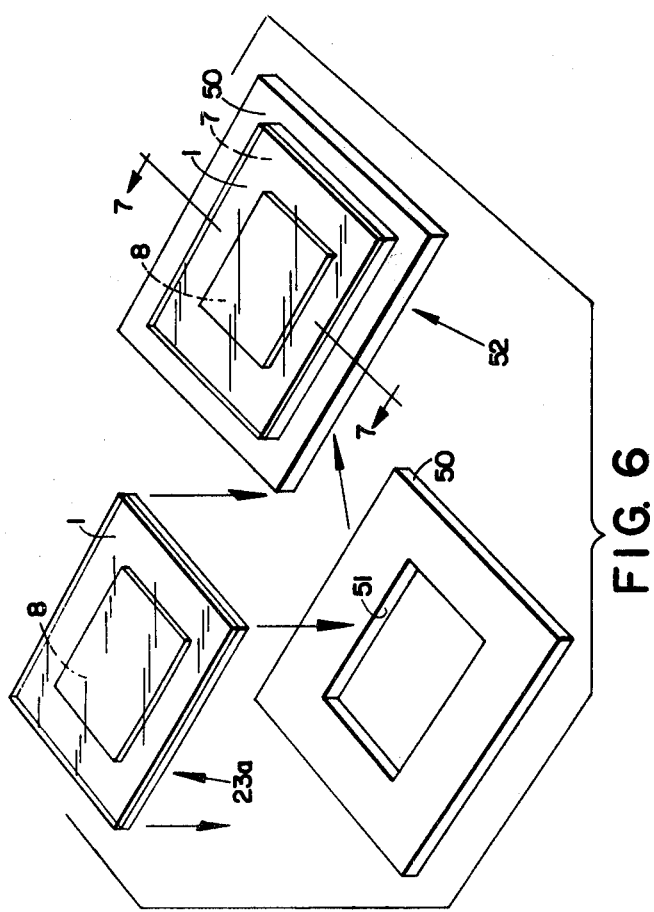

METHODS FOR MAKING ELECTRICAL CELLS AND BATTERIES

This is a division of application Ser. No. 811,472, filed June 30, 1977 now U.S. Pat. No. 4,124,742.

This application relates to the art of electrical cells and batteries, and particularly to novel methods and apparatus for making the same.

In U.S. Pat. No. 4,119,770, issued on Oct. 10, 1978 to Edwin H. Land for Electrical Cells and Batteries and assigned to the assignee of this application, laminar cells and batteries of excellent performance capabilities are disclosed. The batteries in accordance with the teachings of U.S. Pat. No. 4,119,770 are characterized by thin flat laminar cells connected in series by conductive plastic intercell connectors. The cells include wet slurry cathodes, and anodes of the dry patch type formed as thin dry porous layers of conductive electrode particles adhered to the substrate with a binder, and later wet with gel electrolyte. Cellophane separators are employed which are directly in contact with the cathode slurries and communicate with the anode layers through the gel electrolyte coated on the anodes.

Various efforts have been made to simplify the manufacture of batteries of the kind just described. In particular, in U.S. Application For Letters Patent Ser. No. 811,469 filed on June 30, 1977 by Stanley M. Bloom, Charles K. Chiklis and Gordon F. Kinsman for Electrical Cells and Batteries and Methods of Making the Same, it is proposed to use, as one basic subassembly in a battery, a triplex laminate of cellophane, zinc and conductive plastic made by coating the zinc in powdered slurry form dispersed in an organic solvent containing a binder, drying that coating, and then coating the zinc side of the dry product with conductive plastic by a similar solvent coating and drying process. Another approach is disclosed in U.S. Application For Letters Patent Ser. No. 811,468 filed concurrently with this application by Edwin H. Land for Electrical Cells and Batteries and assigned to the assignee of this application. In Application Ser. No. 811,468, it is proposed to make batteries in a manner similar to that disclosed in U.S. Application Ser. No. 761,651, but with the omission of the gel electrolyte on the anode side of the cells and certain modifications in compositions and procedures which make it possible to omit the gel electrolyte while still achieving good electrical performance.

Both of the approaches just discussed have in common the omission of the gel electrolyte. A problem that has been encountered in the use of the triplex components, while solvable, is that the extension of the electrode area out to the edges of the separator makes careful attention to detail in the sealing structures and procedures essential to avoid interelectrode shorts. Both approaches rely on aqueous electrolyte from the cathode slurry permeating the cellophane, and thence wetting out the anode to complete the cell. The approach discussed in U.S. Application Ser. No. 811,468 preserves a free border of separator extending beyond the confines of anode and cathode, but it is difficult to bring batteries made in this way up to the performance potential of either carefully sealed triplex batteries, or the batteries described in Application Ser. No. 761,651, because considerable care must be taken to prevent curling and wrinkling of the cellophane in this construction. The proneness of cellophane to wrinkle in a Leclanche environment does not appear to make any measurable difference in the batteries using gel electrolyte, as the gel electrolyte levels out the hills and valleys formed by the wrinkling of the cellophane.

The objects of this invention are to attain the insulative benefits of a border of separator material surrounding the confronting electrode layers, while obtaining the essential advantages of the triplex concept and preventing the wrinkling of cellophane in a wet Leclanche cell environment.

Briefly, the above and other objects of the invention are attained by a manufacturing process in which a sheet of cellophane is laminated, either to an end cell subassembly or to an intercell subassembly for a battery, with a very small amount of a liquid bonding agent, preferably an aqueous binder system. The end cell subassembly typically comprises a metal terminal sheet prelaminated to a sheet of conductive plastic material. In batteries of the kind here under discussion, in which slurry cathodes and dry patch anodes are employed, on one of these end cells there is printed or extruded a series of dry patch anodes by conventional processes known to those skilled in the art. The cellophane is laminated to the anode side of this preformed anode terminal laminate by passing the two sheets through a pair of gear driven nip rolls under pressure, while feeding a small amount of a liquid bonding agent, for example, an aqueous composition containing a polymeric gelling agent, between the sheets as they are laminated, so that a very minute quantity of the bonding agent is uniformly distributed between the sheets. A similar process is used to make intercell subassemblies by laminating cellophane to the zinc patch side of a sheet of conductive plastic preformed with zinc dry patch anodes.

It has been found that the laminates formed as just described dry to smooth flat structures which can later be cut into pieces and assembled into batteries in a manner to be described below. When this is done, and wet slurry cathodes are placed against the cellophane side of the laminates, the cellophane and dry anode patch become wet by electrolyte from the slurry without wrinkling of the cellophane, such that good contact is maintained between the cellophane and the anode patch even though the initial bond between them that has been formed during the laminating process is apparently destroyed as soon as the cellophane is wet. The laminating process does not eliminate the use of gel electrolyte, or at least the use of a gelling agent, as will appear, but it does reduce the amount employed to a very small fraction of that used in prior practices, to the extent that it is not clear that it exists as a distinct layer in the finished product.

The manner in which the invention is carried into practice will best be understood in the light of the following detailed description, together with the accompanying drawings, of illustrative embodiments thereof. In the drawings;

FIG. 1 is a schematic and diagrammatic elevational sketch, with parts shown in cross section, parts omitted, and parts broken away, illustrating the process of making an intercell subassembly laminate in accordance with the invention, as seen substantially along the lines 1—1 in FIG. 2;

FIG. 2 is a schematic plan sketch of the apparatus of FIG. 1, taken substantially along the lines 2—2 in FIG. 1 with the hopper and certain other elements omitted for simplicity;

FIG. 3 is a schematic perspective sketch, fragmentary and diagrammatic in nature, showing a process of making an end cell subassembly in accordance with the invention;

FIG. 4a is an exploded schematic perspective sketch illustrating the components of an anode terminal subassembly in accordance with the invention in a preliminary stage of manufacture;

FIG. 4b is a schematic perspective three quarter view of an anode terminal subassembly completed and ready for installation in a battery;

FIG. 5 is a schematic elevational cross sectional sketch, on an enlarged scale, taken essentially along the lines 5—5 in FIG. 4b;

FIG. 6 is a schematic elevational perspective three quarter sketch and flow diagram illustrating the manufacture of a framed intercell subassembly in accordance with the invention;

FIG. 7 is a schematic elevational cross sectional sketch of the apparatus of FIG. 6, substantially along the lines 7—7 in FIG. 6 and on an enlarged scale;

Figure 8:
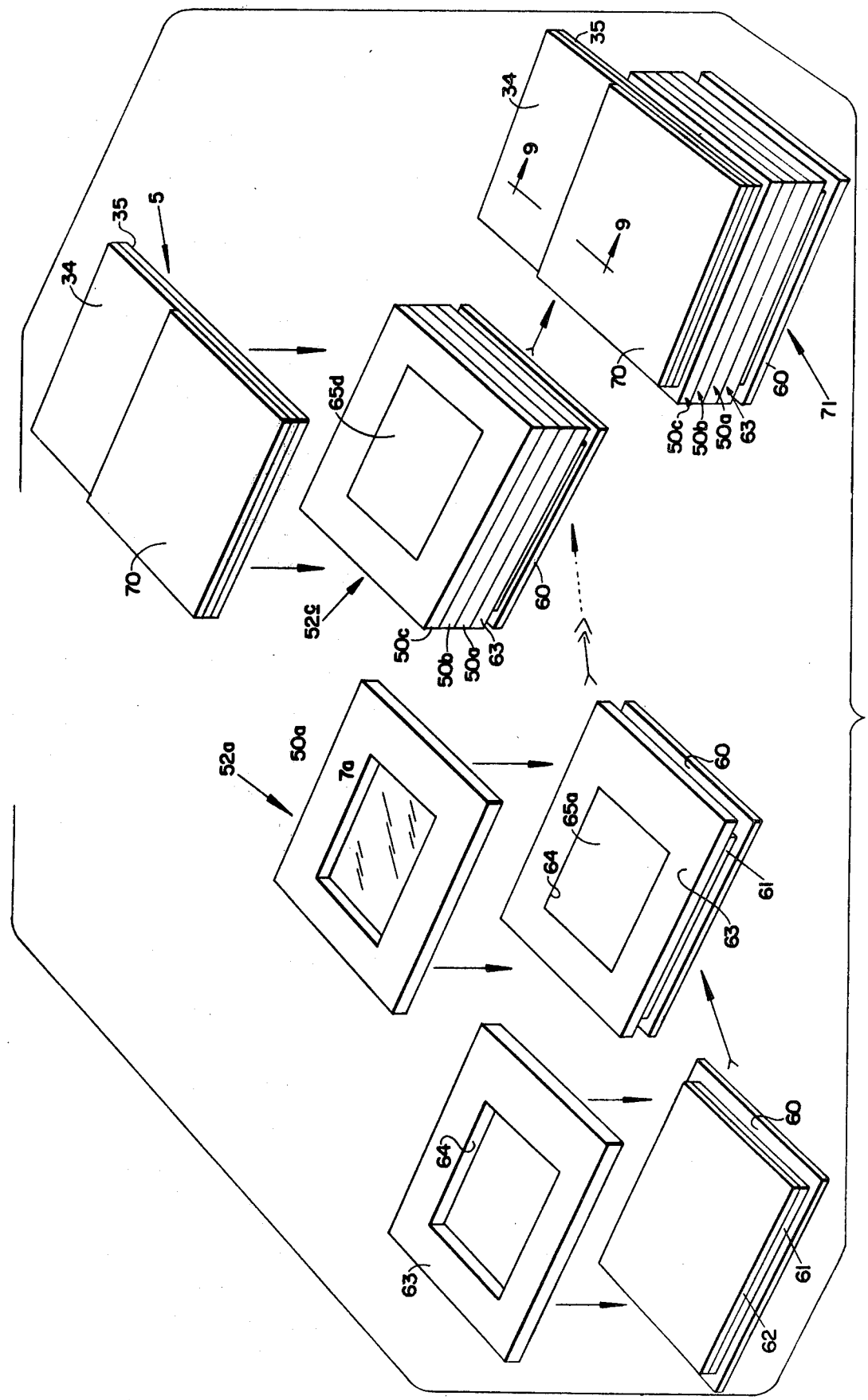
FIG. 8 is a schematic exploded perspective sketch and flow diagram illustrating the assembly of the battery in accordance with the invention with the components illustrated in FIGS. 4–7.

FIG. 9 is a schematic elevational fragmentary cross sectional sketch, with parts broken away, and on an enlarged scale, taken essentially along the lines 9—9 in FIG. 8 and showing details of a battery made in accordance with the invention after sealing. FIGS. 1 and 2 illustrate the process of forming a laminate from a sheet of cellophane 1 and a sheet of intercell connector subassembly material generally designated 2. The cellophane 1 may conveniently be supplied from a roll 3 disclosed on a suitable arbor 4 in a conventional manner. Similarly, the intercell subassembly 2 may be in sheet form and supplied from a supply roll 5 superposed on a rotatable arbor 6.

Referring to FIG. 2, the subassembly 2 consists of a sheet of conductive plastic 7, which may be of any suitable conductive plastic and, for example, may be of carbon filled vinyl film about 2 mils in thickness as made and sold by Pervel Industries, Inc. under the trademark Condulon. On this conductive plastic sheet 7 there are printed (or extruded) patches 8 of zinc powder adhered to the surface of the sheet 7 with a polymeric binder, and for example from ½ mil to 1½ mils in thickness. The area of these patches determines the area of the electrodes in the final battery, as will appear.

Referring again to FIG. 2, the portion of the sheets 1 and 2 within the dotted lines are those to appear in the final product. Following lamination in a manner to be described, the laminate is slit along these dotted lines and the outside portions removed and discarded as waste.

Referring to FIGS. 1 and 2, the sheets 1 and 2 are passed between a pair of nip rolls 10 and 11 arranged to be driven in the sense shown by the arrows by any convenient drive means connected to one of a pair of gears 12 and 13 that are intermeshed in order to drive the rolls 10 and 11 at the same speed and in opposite directions. As illustrated, the rolls 10 and 11 may be mounted on shafts 14 and 15 fixed to gears 12 and 13 respectively, and journaled in suitable bearings suggested at 16 and 17, respectively.

The rolls 10 and 11 are arranged to compress the sheets 1 and 2 tightly together. A suitable dispenser 20 arranged above the nip of the rolls is provided with a supply of gel composition 21 that is metered through a suitable orifice 22 into a pool between the sheets 1 and 2 in the nip of the rolls. Since the sheets 1 and 2 pass between the rolls 10 and 11 under pressure, only a small amount of this fluid is admitted between them.

The composition 21 has as its essential ingredient a bonding agent, such as a water soluble polymer, whose principle function is to bond the sheets 1 and 2 together. One suitable composition for this purpose comprises a gel electrolyte of the following composition, in percent by weight based on the total weight of composition:

| | |
|---|---|
| $NH_4Cl$ | 22.2 |
| $ZnCl_2$ | 10.1 |
| $H_2O$ | 64.7 |
| Natrosol 250 HHR | 3.0 |
| | 100.0 |

Natrosol 250 HHR is hydroxyethyl cellulose, sold by Hercules, Inc. of Wilmington, Del.

This composition has been used successfully in amounts of 20 milligrams per square foot, or about 215 milligrams per square meter. Assuming the specific gravity of this composition to be about 1.14, which is the value without the Natrosol, the implication is a wet "layer" about 0.2 microns thick. It may be doubted that this amount of material exists as a separate layer. After drying, one would expect to find the dry materials adsorbed or absorbed in one or both confronting surfaces of the laminate.

It will be noted that the amount of hydroxyethyl cellulose bonding agent applied as just described is only 6.45 mg/m². In general, amounts less than 10 mg/m² will be effective. The amount applied can be raised to some extent by adjusting the pressure between the nip rolls, and more widely by changing the concentration of the bonding agent. Specifically, a similar solution with only 1 percent by weight of hydroxyethyl cellulose has been employed, with good results.

A presently preferred bonding composition simply consists of a solution of 3 percent by weight of hydroxyethyl cellulose in water, based on the weight of solution. The composition first given above included the electrolytes because they were needed in the final anolyte, but, being present in such small quantities, essentially all of the electrolyte required must come from the cathode slurry in any event, so that it is simpler to omit the electrolyte from the binder composition. On the other hand, the bonding agent, such as a water soluble polymer or the like, cannot be omitted from this composition. When the polymer was omitted from the above composition no adherence to the cellophane resulted.

The water used in the liquid bonding composition performs the function of distributing the bonding agent uniformly, and presumably of wetting the confronting surfaces in the laminate to absorb or adsorb some of the bonding agent in or on both surfaces. As the bonding agent, any material effective to produce a bond between the cellophane and the confronting surface of the electrode or conductive plastic, when dry, that is not inimical to the battery, and which is soluble in the water, may be employed.

The liquid 21 flowing down into the nip of the rolls 10 and 11 between the sheets 1 and 2 may form a pool that can spill over slightly at the ends, be terminated a little ahead of the ends, of fluctuate somewhat between these extremes, the only critical consideration being that it extends beyond the surfaces of the dashed lines in FIG. 2 so that the useful portion of the laminate will be evenly wet by the composition 21.

From the rolls 10 and 11, the laminate 23 formed by joining the sheets 1 and 2 with the composition 21 is transported through a conventional dryer 24, as by being passed over 1 or more idler rolls such as 25. From the drier 24, the dried laminate 23 is taken up on a suitable supply roll 26, as schematically indicated. The drier 24 may be a conventional air drier operating at a relatively low temperature, for example, 140° F., and it is not required to handle a heavy drying load because only a very small amount of the composition 21 is admitted between the sheets 1 and 2. Since the effluent vehicle is water, the drying air with its minutely increased water content can be dehumidified and recycled, or simply passed out the stack.

FIG. 3 illustrates a process of making an end terminal subassembly laminate. The process is basically the same as that described in connection with FIGS. 1 and 2, but the components are selected to produce a terminal half cell having an external metal terminal sheet. As above, one of the elements of the laminate is a sheet of cellophane 32, which in this instance is of less width than the other component of the laminate.

The second component is a preformed laminate comprising a metal terminal sheet 34 of tinned steel, aluminum or the like, for example about 2 mils in thickness. To this terminal sheet 34 is prelaminated a conventional sheet 35 of conductive plastic, which may be the same as the material of the sheet 7 in FIG. 2.

On the surface of the conductive plastic current collector sheet 35 are pre-deposited patches 36 of zinc powder adhered to the collective plastic substrate with a binder, as described above in connection with the patches 8 on the sheet 2. However, in accordance with a presently preferred embodiment of the invention, these patches 36 are not centered on the sheet 33, but are off to one side to allow for a later formation of anode terminal extensions that will be folded over in the assembly of the battery in a manner to be described. If this particular feature is not desired, of course, the cellophane can be centered, as in FIGS. 1 and 2, and be of the same width as the end terminal sheet 34.

A portion at the edge of the sheets and indicated by the dotted lines 37 may be regarded as waste and later trimmed off. Alternatively, liquid may be allowed to flow to the edges of the sheet and thereby get a good bond all the way to the edge of the sheets.

Dotted lines such as 38 indicate where the laminate will be slit after final assembly to make individual half cell terminal assemblies. As described above, fluid composition 39 is supplied between the sheets 32 and 33 in the nip between a pair of gear driven nip rolls 40 and 41 such as the rolls 10 and 11 described above. As suggested at 42 and 43, the rolls 40 and 41 are geared together such that if one of the gears 42 and 43 is driven the other will be driven thereby to cause the rolls 40 and 41 to rotate in opposite directions and therefore advance the sheets 32 and 33 under pressure while receiving a supply of the composition 39. The composition 39 may be the same as the composition 21 described above. From the nip rolls 40 and 41, the laminate 42 formed from the sheets 32 and 33 is passed to a drier and may thereafter be rolled up for storage.

FIG. 4a shows an anode terminal subassembly in the stage of manufacture after it has been slit from the laminate 44 along lines such as 38 and 37 in FIG. 3. The laminate at this stage is generally designated 5a and consists of base sheet 34 of metal, the anode collector sheet 35 of conductive plastic adhered thereto, the zinc anode patch 36, and the overlying sheet 32a of cellophane which is at this point bonded both to the surface of the conductive plastic 35 and to the surface of the dry porous zinc anode patch 36. Because the quantity of the adhering composition 39 is so small that it is not clearly present as a distinct layer, it is not shown in this view.

In order to afford sealing access to the surface of the current collector sheet 35 around the periphery of the final battery, the cellophane 32a is cut as indicated by the dotted lines in FIG. 4a, as with a razor blade, to form the structure shown in FIG. 4b in which the separator sheet 32b is now well within the confines of the perimeter of the sheet 35. FIG. 5 shows the relationship in more detail, although the dimensional relationships shown should not be taken literally because the parts are quite thin and the exact structure in the interfacing surface and edge regions is difficult to depict.

FIG. 6 shows the process of making a framed intercell half cell subassembly in accordance with the invention. A first element of the subassembly is a frame 50 of insulating material, and preferably of a hot melt adhesive material such as Versalon 1140 hot melt polyamide resin as made and sold be General Mills, Co. of Minneapolis, Mn. The frame 50 may be from 18 to 25 mils in thickness, for example.

The frame 50 is formed with a central aperture 51 essentially coextensive in area and shape with the electrodes such as 8 to be described. On this frame 50 is placed a piece 23a of the laminate 23 made as described in connection with FIGS. 1 and 2 above. The conductive plastic side 7 of this laminate 23a is placed down over the surface of the frame 50 and there adhered by the application of heat and pressure around its edges to form a subassembly 52 as shown in FIG. 6. Three such subassemblies 52 are required in the manufacture of a four-cell battery in a manner to be described.

FIG. 7 shows a cross section through the finished subassembly 52 and illustates the essential geometrical relationships between the components. It will be noted at this stage that the separator 1 extends substantially beyond the border of the electrode 8, and that the latter is substantially in registry with the aperture 51 in the frame 50.

FIG. 8 illustrates a process of assembling batteries using the subassemblies made in the manner described above. The process may be commenced with the preparation of a cathode cell end terminal subassembly mounted on an insulating base sheet 60 of kraft paper or the like and comprising a cathode terminal 61 of tinned steel, aluminum or the like, for example about 2 mils in thickness, adhered in any suitable desired manner to the sheet 60 in a conventional fashion. As is common in the art, the sheet 60 may be provided with an aperture for electrical access to the terminal sheet 61 in a manner known in the art per se and not shown.

Onto the surface of the conductive plastic current collector sheet 62 is placed a frame 63 which may be of the same material and dimensions as the frame 50 described above. It is provided with a central aperture 64 coextensive with the area of the electrodes to be employed and preferably is large enough to slightly overlap the current collector sheet and terminal sheet 61 on all sides to provide a desired interelectrode insulating function. The frame 63 is placed down over the current collector sheet 62 and there bonded by application of heat and pressure.

Next, a layer of cathode slurry 65a is extruded into the opening 64 in the frame 63 and onto the surface 62 of the conductive plastic cathode current collector. The cathode slurry composition may be that described in the above cited application Ser. No. 761,651, but preferably includes about 10 percent more liquid electrolyte, because a portion of that electrolyte will be used to wet the separator and zinc anode in the same cell. In addition, the cathode slurry preferably includes from 4 to 6 percent of mercuric chloride based on the weight of slurry. A specific useful composition is as follows, in percent by weight based on the weight of slurry:

| | |
|---|---|
| $MnO_2$ | 49.5 |
| Shawinigan Black | 6.2 |
| $H_2O$ | 28.2 |
| $NH_4Cl$ | 9.7 |
| $ZnCl_2$ | 4.4 |
| $HgCl_2$ | 2.0 |
| | 100.0 |

Following the deposition of the cathode slurry layer 65a, a first subassembly 52a of the kind described in connection with FIG. 6 and 7 is placed down over the frame 63 with the cellophane side in contact with the cathode slurry 65a and the conductive plastic side 7a on the outside as suggested in FIG. 8. The frame 50a may now be bonded with the frame 63, as by heat with or without pressure. Alternatively, sealing may be deferred until after final assembly of the battery in a manner to be described. There is some preference for step by step sealing, as a lower external temperature can be employed.

As suggested in FIG. 8, assembly proceeds by repetition of the steps just described with the additional subassemblies 52 comprising the frames 50b and 50c with the intermediate extrusion of cathode slurry layers 65, culminating in the deposition of the fourth cathode slurry layer 65d as shown in FIG. 8. As a final step in the assembly, the anode half cell terminal subassembly 5 is put in place with the cellophane side 32b down (compare FIGS. 4b and 9).

A glassine sheet 70 is preferably placed over the anode end steel 34, where it is adhesively secured in any conventional manner, in the manner and for purposes described in U.S. Pat. No. 4,019,251, issued on Apr. 26, 1977 to Thomas P. McCole for Flat Battery and Method of Manufacture, and assigned to the assignee of this application. The finished subassembly designated 71 in FIG. 8 may then be subjected to final sealing procedures by the application of heat and pressure around the periphery, and the projecting portions of the metal terminal 34 and plastic anode collector 35 folded around to make them accessible on the same side as the cathode terminal in a conventional manner.

FIG. 9 suggests the internal construction of the battery 71 following sealing. As shown, the sealing procedure effects a peripheral compaction around the edges of the battery. The cellophane separators, which became detached from the adjacent components when wet, although still in intimate contact therewith, are well buried in the mutually sealed frames and conductive plastic layers. Thus, the electrochemically active elements are surrounded by a liquid tight peripheral seal.

The following example illustrates the practice of the invention:

EXAMPLE I

Fifteen batteries were made in the manner described above with 1.34 mil PUD-O cellophane laminated to 2 mil Condulon conductive plastic film on which there were predeposited zinc dry patch electrodes. The lamination was done using the aqueous bonding composition first described above including $ZnCl_2$ and $NH_4Cl$. Anode end cell stock was made by the same process, using 1.34 mil PUD-O cellophane and 2 mil Condulon prelaminated to 2 mil tinned steel with predeposited zinc dry patch electrodes.

The anode patches were made by predepositing and drying the following wet composition, in which composition is expressed in parts by weight, in accordance with the presently preferred practice of the invention:

| | |
|---|---|
| Zinc powder | 1,000 |
| $H_2O$ | 149.2 |
| Benton LT Dispersant | .61 |
| Tetrasodium pyrophosphate | .25 |
| Shawinigan Black | 5 |
| Polytex 6510 Latex | 39.05 |

Polytex 6510 is an acrylic emulsion resin made and sold by Celanese Corp., of Newark, New Jersey. Benton LT is an organic derivative of hydrous magnesium aluminum silicate, as made and sold by National Lead Co., Inc. of N.Y., N.Y.

This composition was preformed on the conductive plastic sheets as dry patches of an area about 2½ by 1⅞ inches and from 1½ to 2 mils in thickness, and a weight of 0.5 to 0.6 grams.

The laminated end cell stock made as described above was cut into end cell components (5a in FIG. 4a) each 3.114 by 3.863 inches. The cellophane separator was then cut down to 2.33 by 2.97 inches to form subassemblies such as 5 in FIG. 4b.

The intercell subassemblies such as 23a in FIG. 6 were cut to 2.13 by 2.80 inches and heat sealed to frames of 24 mil Versalon 1140 hot melt adhesive each 2.87 by 3.53 inches in outer dimensions and formed with apertures 2.13 by 2.80 inches to form subassemblies such as 52 in FIG. 6.

The cathode end cell subassemblies were made using five mil kraft paper insulators 60 adhered to the end terminals 61 of 2 mil tinned steel prelaminated to 2 mil Condulon with the elements 60 and 61 cut to 2.13 by 2.80 inches, and heat sealed to a 9.5 mil Versalon 1140 frame 63 sheet otherwise had the same dimensions as the frames 50a, 50b and 50c.

The cathode patches were made from the following slurry composition, expressed in percent by weight based on the total weight of slurry:

| | |
|---|---|
| $MnO_2$ | 48.78 |
| Shawinigan Black | 6.10 |
| $H_2O$ | 28.78 |
| $ZnCl_2$ | 4.49 |
| $HgCl_2$ | 1.96 |
| | 100.0 |

Shawinigan Black is carbon black as made and sold by Shawinigan Products Corp. of N.Y., N.Y., in the 100 percent compressed form. To make this slurry, the carbon black preblended with the MnO₂ and the mixture stirred into a solution of salts in water. 3.5 grams of this slurry were applied for each patch, using a sheet of poly(methyl methacrylate) as a spatula and the frames as a mask, to form cathode slurry patches above 2.5 by 1.875 inches.

The assembled batteries were heat sealed by an impulse sealing technique as described in the above cited Pat. No. 4,019,251.

Fourteen of these batteries, identified as Examples IA through IN below, were tested for open circuit voltage (OCV) and closed circuit voltage with a load of 3.3 ohms for 0.1 seconds, on the day of manufacture, one month later, and, with the exception of Examples IF and II, two months later, with the results shown in Table I below. Also shown in Table I is the internal impedance $R_i$, in ohms, for each battery calculated from the values of OCV, CCV and the 3.3 ohms load by the relationship $R_i = 3.3 \, (OCV/CCV - 1)$.

TABLE I

| EXAMPLE | DAY OF ASSEMBLY | | | ONE MONTH | | | TWO MONTHS | | |
|---|---|---|---|---|---|---|---|---|---|
| | OCV | CCV | Ri | OCV | CCV | Ri | OCV | CCV | Ri |
| IA | 6.79 | 6.19 | .32 | 6.70 | 6.03 | .40 | 6.73 | 5.94 | .44 |
| IB | 6.77 | 6.16 | .33 | 6.73 | 5.88 | .48 | 6.71 | 5.96 | .42 |
| IC | 6.77 | 6.16 | .33 | 6.73 | 6.00 | .40 | 6.70 | 5.96 | .41 |
| ID | 6.78 | 6.14 | .34 | 6.75 | 6.01 | .41 | 6.72 | 5.94 | .43 |
| IE | 6.80 | 6.20 | .32 | 6.75 | 5.91 | .48 | 6.73 | 5.99 | .41 |
| IF | 6.81 | 6.19 | .33 | 6.77 | 6.02 | .41 | — | — | — |
| IG | 6.80 | 6.17 | .34 | 6.75 | 6.01 | .41 | 6.72 | 5.92 | .45 |
| IH | 6.79 | 6.19 | .32 | 6.73 | 6.01 | .40 | 6.70 | 5.86 | .47 |
| II | 6.78 | 6.18 | .32 | 6.52 | 3.83 | 2.32 | — | — | — |
| IJ | 6.79 | 6.20 | .31 | 6.74 | 5.89 | .48 | 6.46 | 0.08 | >26K |
| IK | 6.78 | 6.22 | .30 | 6.74 | 5.94 | .44 | 6.71 | 5.93 | .43 |
| IL | 6.78 | 6.16 | .33 | 6.72 | 6.01 | .39 | 6.67 | 5.93 | .41 |
| IM | 6.78 | 6.19 | .31 | 6.74 | 5.99 | .41 | 6.71 | 5.95 | .42 |
| IN | 6.77 | 6.15 | .33 | 6.74 | 5.92 | .46 | 6.70 | 5.85 | .48 |

As illustrated by most of the batteries in Table I above, batteries made in accordance with the invention can be quite stable and exhibit low internal impedance after two months. These batteries were hand made, and some were obviously defective. To determine the cause, the battery of Example IJ was dissected and the anode end cell steel was found to be rusted, causing a seal failure. This result was apparently caused by cutting through the conductive plastic when cutting out the cellophane separator. In commercial practice, this problem would be prevented by precutting the separators except at the corners before lamination, so that the bordering regions of the cellophane could be pulled away, without cutting, after lamination.

The fifteenth battery made as described above, identified as Example 10 below, was tested on the third day after assembly and found to have an OCV of 6.72 volts and a CCV of 6.12 volts, with an internal impedance of 0.32 ohms calculated as described above. This battery was also tested for its ability to recharge an electronic flash gun and operate an automatic camera. For this test, a Polaroid SX-70 Land camera was fitted with an electronic flash unit having a light output of about thirty-seven watt seconds, and an input energy requirement of about 80 watt seconds. The flash unit was connected to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit is charged until its ready light glows. The shutter button of the camera is then operated, causing the camera to go through its cycle, during which time the flash unit is discharged. The battery is then electrically disconnected, and allowed thirty seconds to recover. This cycle is estimated to require a total energy of about 90 to 100 watt seconds, and is carried out ten times to simulate a ten-shot photographic sequence. Each time the flash unit is charged during the test, the time between the start of charge and the time when the ready light glows and charging is stopped is noted.

Table II below shows the results of this test applied to the battery of Example 10, in terms of the photographic cycle Number N and the charge time t for each cycle, in seconds.

Table II

| N | t |
|---|---|
| 1 | 3.6 |
| 2 | 4.0 |
| 3 | 4.2 |
| 4 | 4.4 |
| 5 | 4.8 |
| 6 | 4.8 |
| 7 | 5.2 |
| 8 | 5.6 |
| 9 | 5.6 |
| 10 | 6.0 |
| AVE. | 5.3 |

Laminates in accordance with the invention may be employed in other acidic or alkaline electrochemical systems than the Leclanche system. In some instances, it may be desired to form the electrode layer in the laminate of cathodic particles, rather than of anodic particles. As a specific example of an alkaline system in which a laminate could be employed, an alkaline zinc-manganese dioxide battery could be made by the procedures detailed above, except that the zinc chloride and ammonium chloride in the electrolyte used would be replaced by potassium hydroxide.

While the invention has been described with respect to the details of illustrative embodiments, many changes and variations will occur to those skilled in the art upon reading this description, and such can obviously be made without departing from the scope of the invention.

We claim:

1. The method of making a subassembly useful in the manufacture of laminar batteries from a conductive plastic sheet to which electrode patches have been adhered, comprising the steps of passing said plastic sheet with said electrode patches adhered thereto and a sheet of cellophane together through a pair of nip rolls under pressure with said patches confronting said sheet of cellophane while supplying an aqueous composition containing a bonding agent to said sheets in the nip between said rolls, and drying the laminate so produced.

2. The method of claim 1, in which said bonding agent is hydroxyethyl cellulose.

3. The method of claim 2, in which said solution contains $NH_4Cl$ and $ZnCl_2$.

4. The method of making a laminate useful in the manufacture of batteries from a sheet of cellophane and a sheet of conductive plastic on one side of which there are electrode patches, comprising providing a sheet of conductive plastic with electrode patches and a sheet of cellophane and feeding said sheets together between a pair of nip rolls under pressure while supplying an aqueous composition containing a bonding agent to the nip between said rolls.

5. In the process of making laminar electrical cells, the steps of laminating a sheet of cellophane to a sheet of conductive plastic on which there are spaced layers of zinc powder adhered with a polymeric binder by forcing said sheets together with the cellophane next to the zinc layers in the presence of an aqueous composition containing a bonding agent between the sheets, and drying the laminate so formed.

6. In a method of making laminar batteries, the steps of laminating a cellophane separator to a conductive plastic intercell connector and to a laminar electrode comprising a first electrode active material on a central region of a surface of said intercell connector with a minute amount of water soluble bonding agent, and contacting the cellophane side of said laminate with a slurry of electrode particles of a second electrode active material in an aqueous solution of electrolytes to establish a cell by diffusion of said solution through said cellophane and into contact with said first electrode active material.

7. The method of claim 6, in which said bonding agent is hydroxyethyl cellulose.

8. The method of assembling an electrical cell comprising a sheet of conductive plastic on a central region of one surface of which there is a first laminar electrode, comprising the steps of providing laminating a cellophane separator to said electrode and to bordering regions of said sheet with a water soluble or colloidally dispersible bonding agent, and contacting said separator with a slurry layer of electrode particles in an aqueous solution of electrolytes to wet said first electrode layer and said separator without wrinkling of said separator.

* * * * *

UNITED STATES PATENT AND TRADEMARK OFFICE
CERTIFICATE OF CORRECTION

PATENT NO. : 4,161,815
DATED : July 24, 1979
INVENTOR(S) : Edwin H. Land

It is certified that error appears in the above—identified patent and that said Letters Patent is hereby corrected as shown below:

Column 12, line 18, after "prising" insert -- the steps of providing --.

Column 12, line 20, cancel "comprising the steps of providing".

Signed and Sealed this

Fifth Day of August 1980

[SEAL]

Attest:

SIDNEY A. DIAMOND

Attesting Officer

Commissioner of Patents and Trademarks